United States Patent
Jung

[11] Patent Number: 5,539,469
[45] Date of Patent: Jul. 23, 1996

[54] APPARATUS FOR DETERMINING MOTION VECTORS THROUGH THE USE OF AN ADAPTIVE MEDIAN FILTERING TECHNIQUE

[75] Inventor: Hae-Mook Jung, Seoul, Rep. of Korea

[73] Assignee: Daewoo Electronics Co., Ltd., Seoul, Rep. of Korea

[21] Appl. No.: 367,363

[22] Filed: Dec. 30, 1994

[51] Int. Cl.$^6$ .................................................. H04N 7/36
[52] U.S. Cl. ............................................. 348/413; 348/699
[58] Field of Search ................................... 348/402, 411, 348/412, 413, 416, 699, 700, 616

[56] References Cited

U.S. PATENT DOCUMENTS

| 5,327,232 | 7/1994 | Kim | 348/699 |
| 5,414,472 | 5/1995 | Hwang | 348/616 |

FOREIGN PATENT DOCUMENTS

| 0180446 | 5/1986 | European Pat. Off. . |
| 0466981 | 1/1992 | European Pat. Off. . |
| 0511778 | 11/1992 | European Pat. Off. . |
| 0537095 | 8/1993 | European Pat. Off. . |
| 0577165 | 1/1994 | European Pat. Off. . |
| 05176314 | 10/1993 | Japan . |

*Primary Examiner*—Tommy P. Chin
*Assistant Examiner*—A. Au
*Attorney, Agent, or Firm*—Anderson Kill Olick & Oshinsky

[57] ABSTRACT

An apparatus for determining motion vectors for pixels of a current frame which includes a number of processing blocks comprises a motion estimator for providing motion vectors for the pixels in the current frame, an edge detector for detecting edge positions of an object in the current frame to produce edge position signals, a median filter for providing filtered motion vectors of the pixels, a majority detector for obtaining a first and a second majority vectors corresponding to the pixels of a processing block, a controller for generating a control signal, a vector selection block for providing an output motion vector from the first and second major vectors which yields a motion compensated processing block having a least error function, and a switch responsive to the control signal for selecting a motion vector for each processing block from the output motion vector and a motion vector of the pixel located at the center of each processing block.

2 Claims, 3 Drawing Sheets

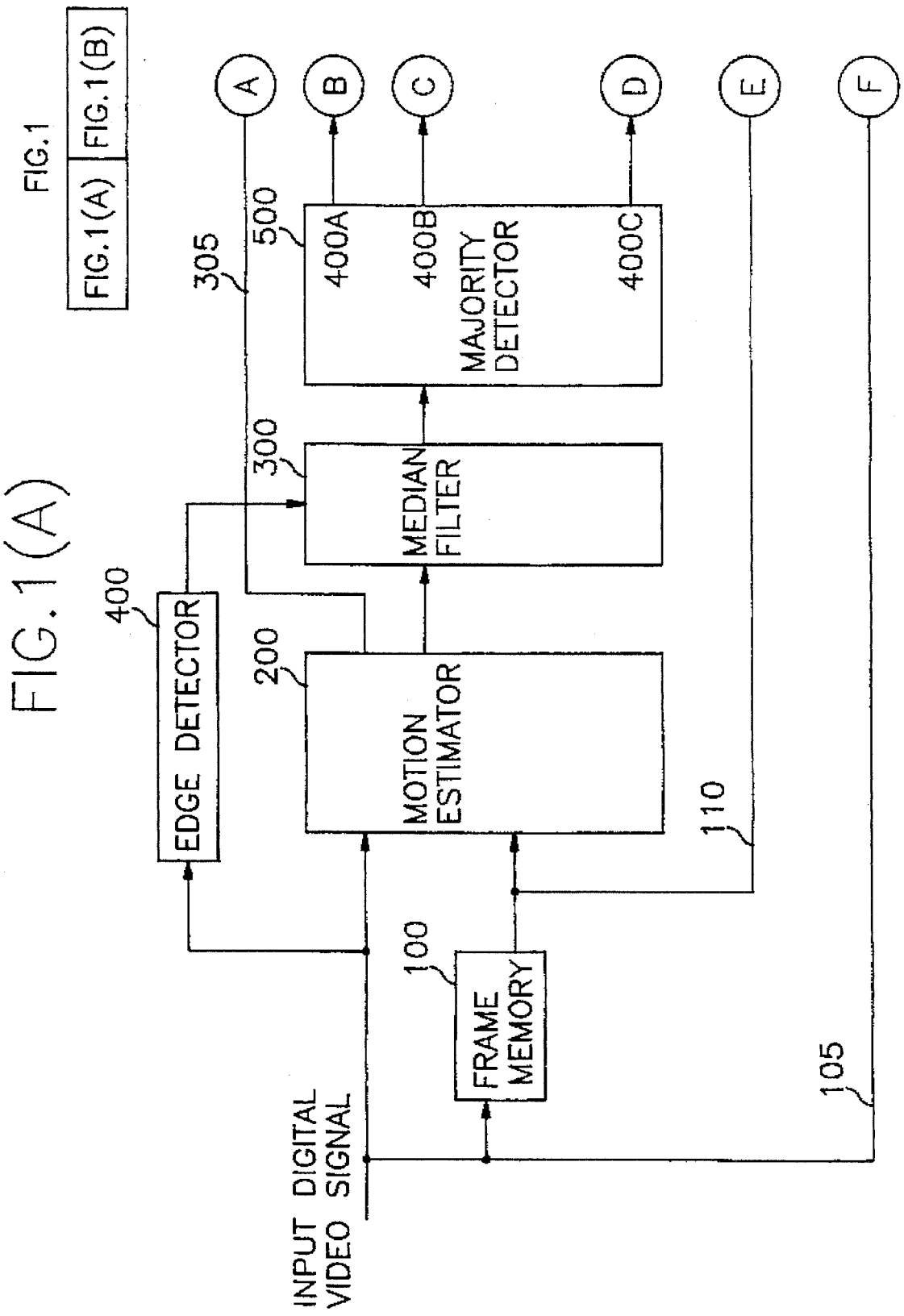

APPARATUS FOR DETERMINING MOTION VECTORS THROUGH THE USE OF AN ADAPTIVE MEDIAN FILTERING TECHNIQUE

FIELD OF THE INVENTION

The present invention relates to an improved apparatus for determining motion vectors; and, more particularly, to an improved apparatus for determining motion vectors through the use of a median filter employing an adaptive filtering window.

DESCRIPTION OF THE PRIOR ART

In various electronic/electrical applications such as high definition television and video telephone systems, an image signal may need be transmitted in a digitized form. When the image signal is expressed in a digitized form, there is bound to occur a substantial amount of digital data. Since, however, the available frequency bandwidth of a conventional transmission channel is limited, in order to transmit the image signal therethrough, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the effective compression techniques.

In the motion compensated interframe coding scheme, current frame data is predicted from previous frame data based on an estimation of a motion between the current and the previous frames. Such estimated motion may be described in terms of two dimensional motion vectors representing the displacement of pixels between the previous and the current frames. One of the motion vector estimation schemes which have been proposed in the art is a block matching algorithm (see, e.g., J. R. Jain et al., "Displacement Measurement and Its Application in Interframe Image Coding", *IEEE Transactions on Communications COM-29*, No. 12 (December 1981)).

According to the block matching algorithm, a current frame is divided into a plurality of equal-sized search blocks. The size of a search block typically ranges between 8×8 and 32×32 pixels. To determine a motion vector for a search block in the current frame, a similarity calculation is performed between the search block of the current frame and each of a multiplicity of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a best matching block, i.e., a candidate block which yields a minimum "error" or difference.

In this motion estimation, it would be desirable or convenient to find out only one minimum mean absolute error over the entire search region corresponding to the search block. Sometimes, however, there may be a plurality of equivalent minimum differences found during the block matching. In this case, the MPEG (Moving Pictures Expert Group) has suggested that all of the other equivalent minimum differences, except the minimum difference that has the highest priority among them, i.e., the one found first, are dropped out although this is not a matter of standardization.

As a result, it is difficult to correctly detect a motion vector, with such a scheme, between the search block and the corresponding search region.

SUMMARY OF THE INVENTION

It is, therefore, a primary object of the present invention to provide an improved apparatus for accurately determining motion vectors through the use of a median filter employing an adaptive filtering window.

In accordance with the present invention, there is provided an apparatus, for use in a motion-compensated video signal encoder, for determining motion vectors representing a displacement between a current frame and a reference frame of video signals, wherein the current frame is divided into a plurality of processing blocks, each processing block having P×Q pixels with P and Q being integers larger than two, and said P×Q pixels include therein a center pixel located at the center of each processing block, which comprises: means for providing a motion vector for each of the pixels included in the current frame, the motion vectors including center motion vectors, each of the object motion vectors being a motion vector for each of the center pixels; means for detecting edge positions of an object in the current frame to produce edge position signals; filtering means, having a filtering window, for median-filtering the motion vectors to generate filtered motion vectors for the pixels included in the current frame, the size of said filtering window varying with the edge position signals; means for counting the number of filtered motion vectors having a same value among the filtered motion vectors for the pixels included in each processing block, thereby sorting out first and second major vectors, the first and the second major vectors representing the filtered motion vectors having the largest and the second largest counted numbers, respectively, for said each processing block; means for calculating error functions for said each processing block based on the first and second major vectors to thereby select as an output motion vector one of the first and second major vectors which yields minimum error function; means for generating a control signal based on the center motion vector, the first major vector and the counted number of the first major vector for said each processing block; and switching means, responsive to the control signal, for selecting one of the output motion vector and the center motion vector as the motion vector for each processing block.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Figure 1B:
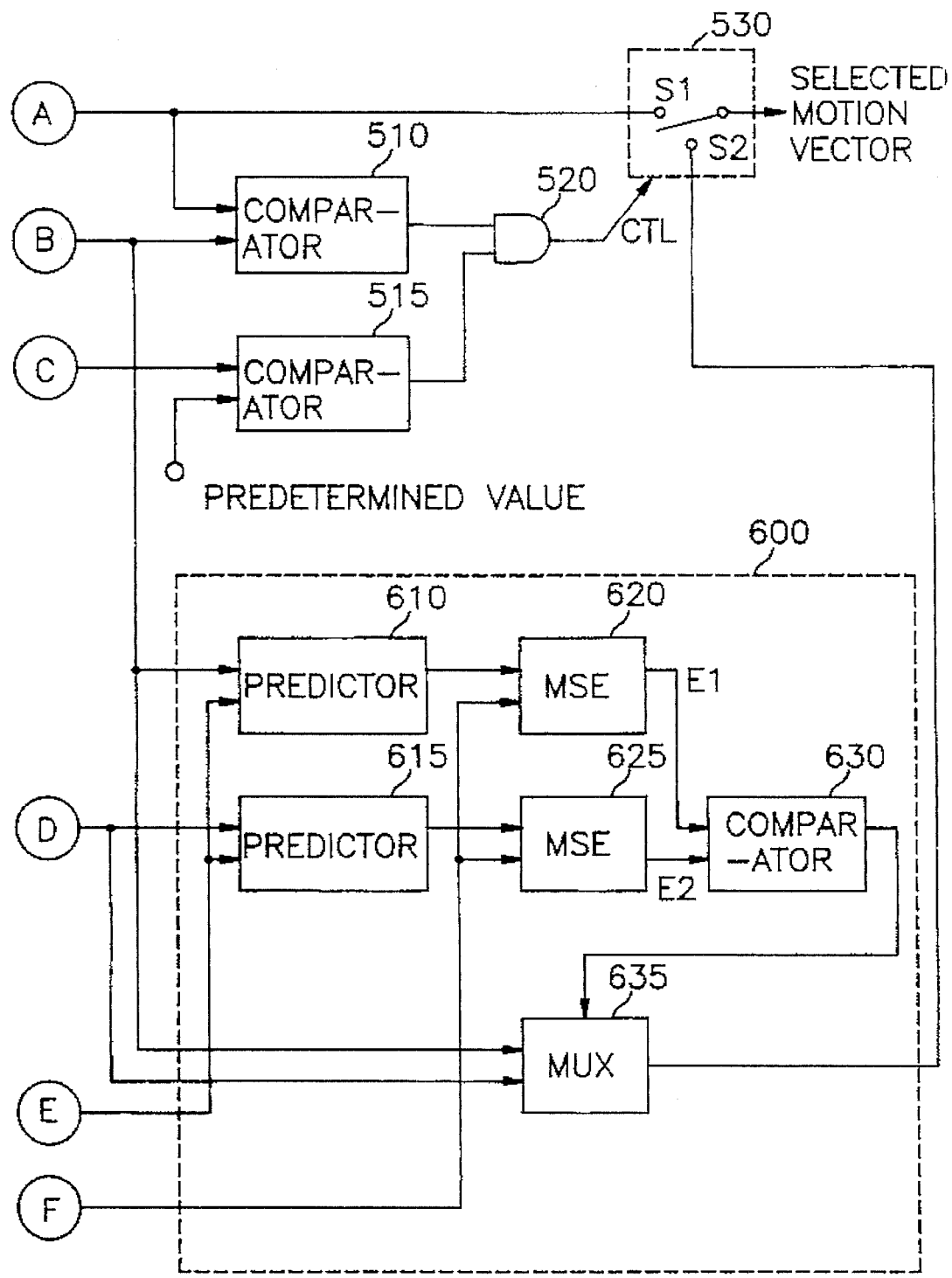
FIG. 1 depicts a block diagram of an inventive apparatus for determining motion vectors between a current frame and a reference frame of video signals.

Referring to FIG. 1, there is shown a block diagram of an inventive apparatus for determining a motion vector for each of a plurality of processing blocks included in the current frame, each of the processing block having P×Q, e.g., 7×7, pixels.

Current frame data is fed as an input digital video signal to a frame memory 100 and motion vector estimator 200. The reference frame data provided from the frame memory 100 is also fed to the motion estimator 200.

The motion estimator 200 serves to determine a motion vector for each of the pixels contained in the current frame by using a block matching algorithm. Specifically, in order to determine a motion vector for a pixel ("target pixel") included in the current frame, a search block of M×N, e.g., 3×3 pixels is set up by using the target pixel as a reference, the target pixel coinciding with the center of the search block. The search block is compared with all of the candidate blocks included in the corresponding search region in the reference frame, on a block-by-block basis, by using the block matching algorithm well known in the art. A displacement for the search block obtained through the use of the block matching algorithm is assigned as a motion vector of the target pixel. Each of the motion vectors corresponding to each pixel included in the current frame is provided from the motion estimator 200 to a median filter 300 for further processing. The motion estimator 200 also provides motion vectors of center pixels to a comparator 510 in accordance with the invention, each of the center pixels being a pixel positioned at the center of each processing block if both Q and P are odd numbered integers; one of two pixels at the center thereof if either Q or P is an even numbered integer; and one of four pixels at the center thereof if both Q and P are even numbered integers. That is, the center pixel is one of maximum four pixels located at the center of the processing block.

As shown in FIG. 1, the current frame data is also provided to an edge detector 400 which serves to detect edge positions of an object within the current frame. The edge detector 400 detects the edge positions of the object in the incoming current frame and generates edge position signals to the median filter 300. The operation of the edge detector 400 will not be described in detail herein as it is well known in the art (See, e.g., A. K. Jain, "Fundamentals of Digital Image Processing", 1989, Prentice-Hall International).

Figures 2, 3:
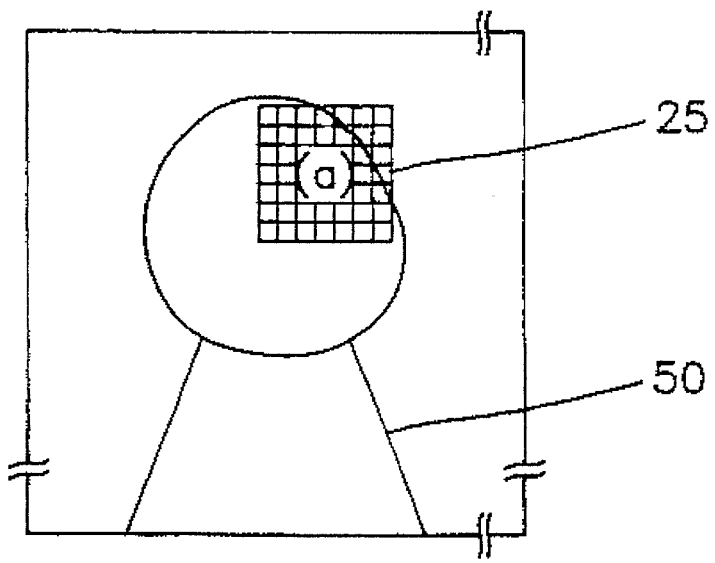
FIG. 2 illustrates an exemplary object in a current frame.
FIG. 3 represents a filtering window for the median filtering of pixels in accordance with the invention.

At the median filter 300, the median filtering operation is performed on each of the motion vectors fed from the motion estimator 200 through the use of an appropriate filtering window. In a preferred embodiment of the present invention, the median filter 300 has an adaptive filtering window having a variable window size as shown in FIG. 3, wherein the size of the adaptive filtering window varies with the edge position signals provided from the edge detector 400.

In accordance with the present invention, the median filter 300 increasingly expands its filtering window until a boundary of the filtering window includes any of the edges. It can be seen from FIG. 3 that the adaptive filtering window W1 is extended to W2 which includes the edge positions of the object 50 shown in FIG. 2. In FIG. 2, the object in the current frame is illustrated to have a processing block 25 having an center pixel (a). Edge positions of the object 50 contained in the processing block 25 are marked with (X) shown in FIG. 3.

The median filter 300 averages the motion vectors for the pixels (a) to (y), which are included in the expanded adaptive filtering window W2, by multiplying predetermined filter coefficients thereto; and assigns the averaged value as a filtered motion vector of the center pixel (a). Each of the filtered motion vectors corresponding to each of the pixels included in each processing block of the current frame is provided from the median filter 300 to a majority detector 500.

The majority detector 500, which receives filtered motion vector corresponding to each of the processing blocks of, e.g., 7×7 pixels, counts the number of filtered motion vectors having a same value and determines a first and a second major vectors, the first and second major vectors corresponding to filtered motion vectors having the largest and second largest counted numbers, respectively. The first and second major vectors are outputted through output terminals 400A and 400C of the majority detector 500, respectively. Also, the majority detector 500 outputs the number of the first major vectors through its output terminal 400B.

A comparator 515 compares the number of the first major vectors from the majority detector 500 with a predetermined value, e.g., 25; and generates a logic high signal to an AND gate 520 if the number of the first major vector is not smaller than 25; otherwise, it generates a logic low signal to the AND gate 520. The comparator 510 compares the first major vector provided from the output terminal 400A with the motion vector of the center pixel fed from the motion estimator 200; and produces a logic high signal to the AND gate 520 if they are identical; otherwise it produces a logic low signal.

In response to the output signals from the comparators 510 and 515, the AND gate 520 generates, as a control signal CTL of a switch 530, a logic high signal if both of the output signals from the comparators 510 and 515 are logic high and a logic low signal if otherwise.

In accordance with the present invention, the inventive apparatus further includes a vector selection block 600 for selecting among the first and second major vectors a major vector which generates a motion-compensated processing block having a less error function, e.g., mean square error. The vector selection block 600 comprises predictors 610 and 615 and mean square error (MSE) detectors 620 and 625.

Specifically, as shown in FIG. 1, the first and second major vectors are provided from the majority detector 500 to the predictors 610 and 615, respectively. In response to each major vector, each of the predictors 610 and 615 extracts the prediction data for the processing block, i.e., pixel data of the reference frame corresponding the first and second major vectors from the frame memory via line 110, and provides the extracted pixel data to the MSE detectors 620 and 625, respectively. The MSE detectors calculate mean square errors between the two inputs, i.e., the processing block data of the current frame provided via line 105 and corresponding prediction data, and provides the calculated values, i.e., mean square errors, E1 and E2 to a comparator 630, respectively.

The comparator 630 compares two input values, i.e., E1 and E2 and generates a selection signal to a multiplexer (MUX) 635 having two input terminals coupled to the output terminals 400A and 400C of the majority detector 500. When E1 is not less than E2, the comparator 630 generates, e.g., a logic high selection signal to the MUX 635, thereby providing the first major vector to a terminal S2 of the switch 530 through line 605; otherwise, it generates a logic low selection signal to the MUX 635, thereby providing the second major vector to the terminal S2.

The switch 530 selects one of the two input signals fed to the two terminals S1 and S2 in response to the control signal CTL. In other words, the switch 530 selects, as a motion vector of the processing block, the input to the terminal S1, i.e., the motion vector of the center pixel if the control signal CTL is logic high; and the input to the terminal S2, i.e., the major vector which yields a less mean square error if otherwise.

While the present invention has been described with respect to certain preferred embodiment only, other modifications and variations may be made without departing from the spirit and scope of the present invention as set forth in the following claims.

What is claimed is:

1. An apparatus, for use in a motion-compensated video signal encoder, for determining motion vectors representing a displacement between a current frame and a reference frame of video signals, wherein the current frame is divided into a plurality of processing blocks, each processing block having P×Q pixels with P and Q being integers larger than two, and said P×Q pixels include therein a center pixel located at the center of each processing block, which comprises:

means for providing a motion vector for each of the pixels included in the current frame, the motion vectors including center motion vectors, each of the center motion vectors being a motion vector for each of the center pixels;

means for detecting edge positions of an object in the current frame to produce edge position signals;

filtering means, having a filtering window, for median-filtering the motion vectors to generate filtered motion vectors for the pixels included in the current frame, the size of said filtering window varying with the edge position signals;

means for counting the number of filtered motion vectors having a same value among the filtered motion vectors for the pixels included in said each processing block, thereby sorting out first and second major vectors, the first and the second major vectors representing the filtered motion vectors having the largest and the second largest counted numbers, respectively, for said each processing block;

means for calculating error functions for said each processing block based on the first and second major vectors to thereby select as an output motion vector one of the first and second major vectors which yields minimum error function;

means for generating a control signal based on the center motion vector, the first major vector and the counted number of the first major vector for said each processing block; and switching means, responsive to the control signal, for selecting one of the output motion vector and the center motion vector as the motion vector for said each processing block.

2. An apparatus, for use in a motion-compensated video signal encoder, for determining motion vectors representing a displacement between a current frame and a reference frame of video signals, wherein the current frame is divided into a plurality of processing blocks, each processing block having P×Q pixels with P and Q being integers larger than two, and said P×Q pixels include therein an center pixel located at the center of each processing block, which comprises:

means for providing a motion vector for each of the pixels included in the current frame, the motion vectors including center motion vectors, each of the center motion vectors being a motion vector for each of the center pixels;

means for detecting edge positions of an object in the current frame to produce edge position signals;

filtering means, having a filtering window, for median-filtering the motion vectors to generate filtered motion vectors for the pixels included in the current frame, the size of said filtering window varying with the edge position signals;

means for counting the number of filtered motion vectors having a same value among the filtered motion vectors for the pixels included in said each processing block, thereby sorting out first and second major vectors, the first and the second major vectors representing the filtered motion vectors having the largest and the second largest counted numbers, respectively, for said each processing block;

means for calculating error functions for said each processing block based on the first and second major vector to thereby select as an output motion vector one of the first and second major vectors which yields a minimum error function;

means, responsive to the center motion vector and the first major vector, for generating a first control signal if the center motion vector and the first major vector are identical each other, and a second control signal if otherwise;

means for comparing the number of the first major vector with a predetermined number to thereby generate a third control signal if the number of the first major vector is not less than the predetermined number, and a fourth control signal if otherwise;

means, in response to the first, the second, the third and the fourth control signals, for generating a first selection signal if the first and third control signals are applicable, and a second selection signal if otherwise; and switching means, for selecting, as a motion vector for said each processing block, the center motion vector in response to the first selection signal, and the output motion vector in response to the second selection signal.

* * * * *